Figure 1:
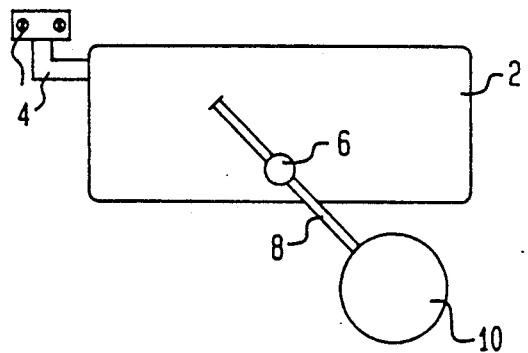

United States Patent [19]

Rifaat

[11] Patent Number: 5,015,027
[45] Date of Patent: May 14, 1991

[54] SUN VISOR

[76] Inventor: Mahassen S. Rifaat, 636 Valley Rd., Watchung, N.J. 07060

[21] Appl. No.: 517,406

[22] Filed: Apr. 30, 1990

Related U.S. Application Data

[63] Continuation of Ser. No. 250,765, Sep. 28, 1988, abandoned.

[51] Int. Cl.⁵ .............................................. B60J 3/02
[52] U.S. Cl. ............................... 296/97.6; 296/97.8
[58] Field of Search ............... 296/97.8, 97.60, 97.2, 296/97.4

[56] References Cited

U.S. PATENT DOCUMENTS

| | | | |
|---|---|---|---|
| 2,101,901 | 12/1937 | Fletcher | 296/97 |
| 2,385,557 | 9/1945 | Ward | 296/97 |
| 2,526,889 | 10/1950 | McComb | 296/97 |
| 2,596,873 | 5/1952 | Solmes | 296/97 |
| 2,685,336 | 8/1954 | Menighan | 160/33 |
| 2,831,726 | 4/1958 | Ralston | 296/97.6 |
| 2,894,576 | 7/1959 | Williams | 296/97.6 |
| 2,941,839 | 6/1960 | Pendlebury | 296/97.6 |
| 3,410,602 | 11/1968 | Schuler | 296/97.6 |
| 3,499,679 | 3/1970 | Olander | 296/97.6 |
| 3,853,370 | 12/1974 | Barnhart | 296/97 C |
| 4,003,597 | 1/1977 | Acuff | 296/97.6 |
| 4,058,340 | 11/1977 | Pinkas | 296/97 G |
| 4,169,552 | 10/1979 | Lichtenstein | 296/97 C |
| 4,195,876 | 4/1980 | Timperio | 296/97 G |
| 4,323,275 | 4/1980 | Lutz | 296/97 G |
| 4,399,347 | 8/1983 | Schmitt | 219/203 |
| 4,526,415 | 7/1985 | Jardine | 296/97 F |
| 4,623,188 | 11/1986 | Juraschek | 296/97 G |
| 4,707,017 | 11/1987 | Minobe et al. | 296/78.1 |
| 4,707,018 | 11/1987 | Gavagan | 296/976 |
| 4,707,019 | 11/1987 | Ebert et al. | 296/97 K |
| 4,711,483 | 12/1987 | Gulette et al. | 296/97 C |
| 4,792,176 | 12/1988 | Karford | 296/97.8 |
| 4,792,177 | 12/1988 | Svensson | 296/152 |

FOREIGN PATENT DOCUMENTS 575011 3/1957 Italy ..................................... 296/97.6

Primary Examiner—Robert R. Song

[57] ABSTRACT

A visor assembly for a vehicle comprises a first visor body and second visor body coupled for movement to first visor body.

3 Claims, 2 Drawing Sheets

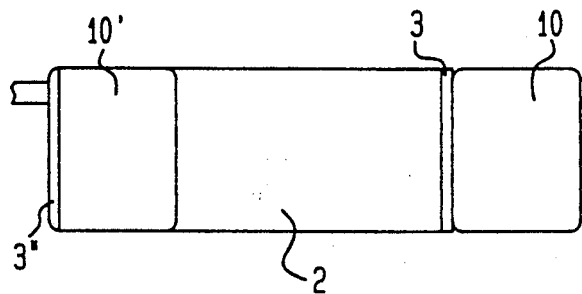
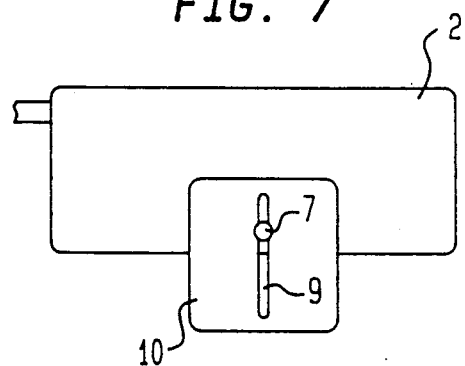
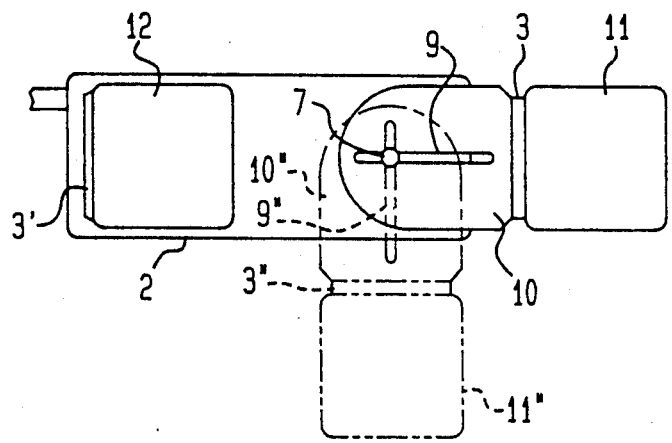

SUN VISOR

This is a continuation of copending application Ser. No. 250,765 filed on Sept. 28, 1988, now abandoned.

The present invention relates to sun visors and sun shields for vehicles and more particularly for motor vehicles.

Automobiles and various other types of vehicles are generally equipped with sun visors to shield the eyes of the operator, driver or pilot from direct sunlight entering through the vehicle windshield, particularly from morning and afternoon sunlight when the sun is at a low elevation and thus particularly disturbing to the operator's view ahead, for example, through a windshield.

Typically, such a sun visor utilizes a flat body portion, which is usually opaque, or otherwise of sufficient opacity to attenuate direct sunlight to an acceptable low level. The body portion is generally attached by friction hinges to the vehicle interior just above the windshield. When not in use and in its home position, the visor typically is folded flat against the vehicle dome or ceiling so as not to interfere with the driver's vision through the windshield. When it is in use, the visor body portion is turned down to a more or less vertical position to shield against low incident angle sunlight while, at the same time, leaving a sufficient area of the windshield unobscured for vision. Typically, the reach of the visor body portion is made sufficient to shield against sunlight down to some predetermined low angle of incidence. However, when the sun's elevation is at a still lower angle, direct sunlight typically can reach the driver's eyes under the edge of the visor body portion. This may typically occur, for example, when climbing a grade towards a rising or setting sun causes the apparent elevation of the sun to be very low. Extending the downward reach of the sun visor by simply using a wider visor body portion is generally undesirable since it will tend to obscure vision to an extent that is undesirable for safe operation of the vehicle without the justification of shielding against sunlight which also is undesirable. Furthermore, it is recognized that the sun may cause undesirable interference even though it is off to one side and thus beyond the shielding width of the sun visor. Increasing the width of the sun visor to cover extreme angles of incidence is recognized as undesirably obscuring vision to an excessive extent for general use in vehicles.

In accordance with an aspect of the invention, a visor assembly comprises a first visor body and a second visor body coupled for movement to the first visor body.

In accordance with another aspect of the invention, the visor assembly includes a coupling arrangement for coupling the first and second visor bodies, wherein the coupling arrangement comprises a slidable coupling.

In accordance with yet another aspect of the invention, the coupling arrangement comprises a rotatable coupling.

In accordance with still another aspect of the invention, the slidable coupling comprises an extendible member.

In accordance with a further aspect of the invention, the coupling arrangement comprises a further slidable coupling.

In accordance with still a further aspect of the invention, the further slidable coupling comprises a further extendible member.

In accordance with yet a further aspect of the invention, the visor assembly includes an arrangement for coupling the first and second visor bodies, wherein the coupling arrangement includes a rotatable coupling.

In accordance with another further aspect of the invention, the coupling arrangement includes a further rotatable coupling.

Figure 2:
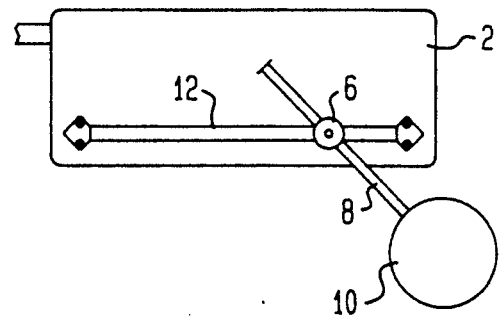
Figure 3:
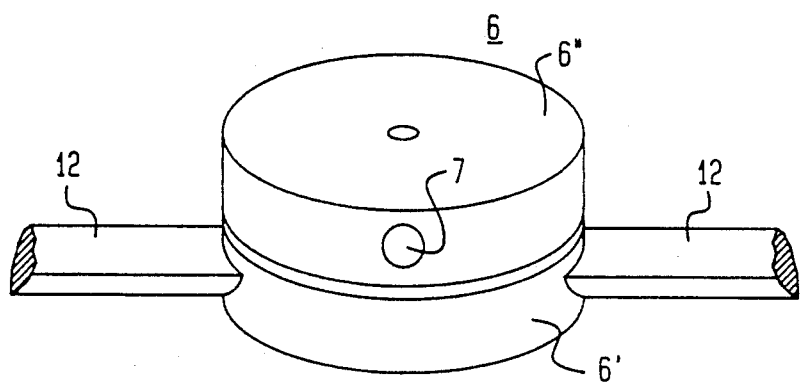

The invention will next be described in greater detail by way of preferred embodiments and with the aid of the Drawing, in which FIGS. 1 and 2 show respective visor embodiments in accordance with the present invention, not to scale;

FIG. 3 shows a detail, not to scale, helpful in understanding the embodiment of FIG. 2; and FIGS. 4, 5, 6, 7 and 8 show respective visor arrangements in accordance with the present invention, not to scale. Like reference numerals identify similar features in the figures.

FIG. 1 shows a sun visor arrangement in which a first visor body 2 is mounted for movement by way of a hinged bracket assembly 4 adapted to be affixed to a vehicle body, not shown. Visor body 2 has affixed thereto a rotatable hinge or knob 6. A bar or rod 8 passes through a hole in knob 6 in a sliding fit. Both the rotation of knob 6 with respect to visor body 2 and the movement of rod 8 through knob 6 have sufficient friction associated therewith to prevent undesirable movement of rod 8 and yet not so great as to require much force to so move it, so that it may be conveniently moved by hand at pleasure. Friction of this sort is readily obtainable by using plastic bushings or inserts, spring washers, and the like.

A second visor body 10 is affixed to one end of rod 8, the other end of rod 8 having an enlarged portion so as to prevent rod 8 from being inadvertently pulled out of knob 6.

In operation, visor body 2 is brought down into its shielding position. Should direct sunlight coming from a direction bringing it beyond the zone of protection of visor body 2 be objectionable, visor body 10 is manipulated to provide shielding as it may be needed. The range of movement of visor body 10 with respect to visor body 2 is made sufficiently great so as to permit visor body 2 to be readily positioned to provide shielding coverage over a predetermined expected area of, for example, a windshield.

In the visor shown in FIG. 2, and of which a detailed partial view is shown in FIG. 3, a further bar 12 is mounted at a small distance from the surface of visor body 2. A knob or hinge body 6 has a portion 6' having a hole therethrough for receiving bar 12. Preferably, bar 12 has a square or other non-circular cross-section with the hole through portion 6' corresponding, so as to prevent rotation of knob 6 relative to bar 12 while allowing it to slide with moderate friction on bar 12. Alternatively, bar 12 and the hole in portion 6' may be made round with sufficient friction being provided to reduce undesired rotation. Knob 6 has a second portion 6" which is pinned or hinged to portion 6' so as to be held to it but allowed to rotate relative thereto, with moderate friction. Bar 8 passes with moderate friction through a hole 7 in portion 6" and is terminated at one end by an enlargement or stop and at the other end is affixed to visor portion 10. The range of movement allowed by sliding of knob 6 or bar 12, the rotation of knob portion 6", and the sliding of bar 8 in knob 6, that is through portion 6", is such as to allow effective shielding against light for over a considerable region beyond visor body 2.

Figure 4:
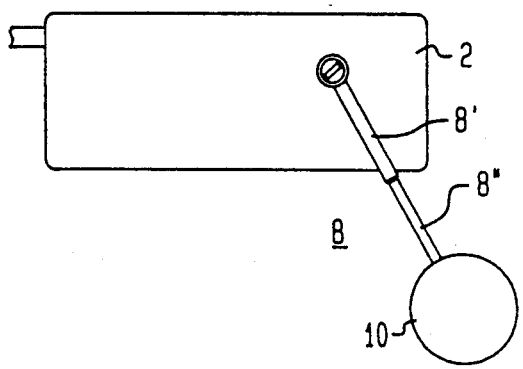

In FIG. 4, rod 8 has first and second telescopic portions 8', and 8", respectively, it being shown in a more or less extended position. One end of rod 8 is pivoted or hingedly attached for rotation to visor body 2 while its other end is attached to visor body 10. By sliding portion 8" in or out of portion 8' and by rotating bar 8 about its pivot on visor body 2, a considerable region is covered for shielding.

Figure 5:
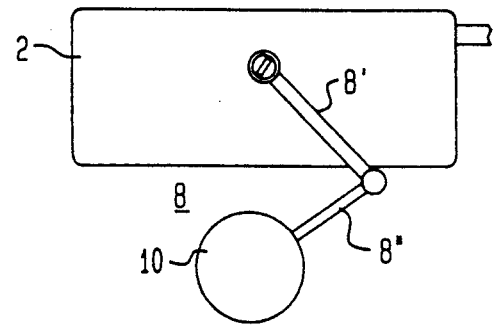

In FIG. 5, rod 8 is shown as having first and second hinged portions 8', and 8", respectively. A considerable region is covered by this arrangement. In the embodiment of FIG. 6, the second and third visor bodies 10 and 10' are coupled together by means of hinges 3 and 3', respectively. Hinges 3 and 3' are shown in symbolic form. Preferably, hinges 3 and 3' are of a known type of spring-loaded hinge, having first and second stable positions such that in the first position the second or, respectively the third visor body is held in a folded position, flat against the first visor body by spring force as indicated in FIG. 6 for third visor body 10' and in the second position the second visor body is held by spring force in an extended, or unfolded position as indicated in FIG. 6 for second visor body 10. Thus, either or both of second and third visor bodies 10 and 10' may be extended to provide shielding or may be folded back against first visor body for convenient storage when not in use.

In the embodiment of FIG. 7, first visor body 2 has a hinge pin 7 affixed thereto. Second visor body 10 has therein a slot 9 arranged for sliding motion, captive to pin 7, which is arranged in a manner to provide sufficient friction such as by a spring washer, not shown, or otherwise, such that second visor body 10 may be conveniently slid along and/or rotated about pin 7 and be held thereby in a stable manner. Second visor body 10 may be pushed in for convenient, inconspicuous storage.

In the embodiment of FIG. 8, second visor body 10 is coupled to first visor body 2 by similar means to that used in the FIG. 7 embodiment, that is by a friction pin 7. A third visor body 11 is coupled to second visor body 10 by similar means to that used in the FIG. 6 embodiment, that is, by a spring loaded hinge 3. Thus, a greater range of motion or coverage for shade is possible by sliding and rotating. The dashed lines indicate a rotated position for parts 10", 3", and 11". For storage, third visor body 11 is folded flat against second visor body 10 and the assembly comprising visor bodies 10 and 11 is slidable and rotatable as convenient. A fourth visor body 12 hingedly coupled to a fifth visor body, not visible in FIG. 8 is shown in the folded, stored position. The arrangement of FIG. 8 may be reversed such that visor body 10 is hingedly coupled to visor body 2 and visor body 11 is coupled to visor body 10 for sliding and/or rotational motion.

While the invention has been described by way of exemplary embodiments, it is contemplated that various modifications may be made that will be readily apparent to one skilled in the art to which it pertains. For example, body portion 10 has been shown as being round, whereas it may readily be made square, octagonal, or some similar convenient shape. Furthermore, friction slides and hinges have been described, whereas screws with wing-nuts may also be utilized for maintaining a selected position. Rod 12 has been described as square to prevent rotation whereas rotation of knob 6 may be readily prevented by allowing close proximity to visor body 2. The use of a retaining clip or the like for storing in the home position, although not described, is likewise considered as such a modification. These and similar modifications are intended to be within the scope of the invention as defined by the claims following.

What is claimed is:

1. A visor assembly for a vehicle, said visor assembly comprising:
   a first visor body;
   a second visor body, said first and second visor bodies being substantially planar;
   means for coupling said first and second visor bodies, wherein said means for coupling comprises slidable coupling means and rotatable coupling means;
   a third visor body; and
   further rotatable coupling means coupling said second and third visor bodies for rotation of said third visor body about an axis substantially parallel to the plane of said second visor body.

2. A visor assembly as recited in claim 1, wherein said visor assembly comprises:
   said first visor body being coupled to said slidable coupling means;
   said slidable coupling means being coupled to said rotatable coupling means; and
   said further rotatable coupling means being coupled to said second visor body.

3. A visor as recited in claim 2, wherein:
   said first visor body is adapted for mounting to an interior surface of said vehicle; and
   said slidable coupling means, said rotatable coupling means, and said further rotatable coupling means comprise respective friction movements.

* * * * *